United States Patent [19]

Minami et al.

[11] Patent Number: 4,469,189

[45] Date of Patent: Sep. 4, 1984

[54] MOTORCYCLE WITH TURBO-CHARGER

[75] Inventors: Shunji Minami, Fukuroi; Hiroshi Kimura, Iwata, both of Japan

[73] Assignee: Yamaha Hatsudoki Kabushiki Kaisha, Japan

[21] Appl. No.: 302,657

[22] Filed: Sep. 15, 1981

[30] Foreign Application Priority Data

Sep. 16, 1980 [JP] Japan ............... 55-128146

[51] Int. Cl.³ ............ F02D 23/00; B60K 13/00; B62K 11/04
[52] U.S. Cl. ............ 180/219; 60/605; 123/559; D12/110
[58] Field of Search ............ 180/219, 228, 291; 283/281 R; D12/110; 60/605; 123/559

[56] References Cited

U.S. PATENT DOCUMENTS

| D. 241,330 | 9/1976 | Morioka et al. | D12/110 |
| D. 248,387 | 7/1978 | Kurishima et al. | D12/110 |
| 3,506,284 | 4/1970 | Mennesson | 280/281 R |
| 3,726,084 | 4/1973 | Meier et al. | 60/605 |
| 4,015,854 | 4/1977 | Ramond | 280/281 R |
| 4,356,877 | 11/1982 | Kamiya | 180/227 |
| 4,359,865 | 11/1982 | Nakao et al. | 180/219 X |
| 4,363,375 | 12/1982 | Kamiya | 180/227 |
| 4,396,085 | 8/1983 | Inoue et al. | 180/219 |

FOREIGN PATENT DOCUMENTS

| 38201 | 10/1981 | European Pat. Off. | 180/219 |
| 64337 | 5/1979 | Japan | 180/219 |
| 118907 | 9/1979 | Japan | 60/605 |
| 625837 | 7/1949 | United Kingdom | 280/281 R |
| 2079367 | 1/1982 | United Kingdom | 60/605 |

OTHER PUBLICATIONS

Yamaha Brochure: "How to Build a Motorcycle", Copyright-Yamaha Motor Corporation, U.S.A., 1977.

Primary Examiner—Joseph F. Peters, Jr.
Assistant Examiner—Mitchell J. Hill
Attorney, Agent, or Firm—Ernest A. Beutler

[57] ABSTRACT

A motorcycle construction embodying a turbo-charger that is fed by means of a collector pipe positioned beneath the engine. The turbo-charger is positioned between the engine and the rear wheels and a splash shield extends between the rear wheel and the turbo-charger so as to protect it.

3 Claims, 3 Drawing Figures

MOTORCYCLE WITH TURBO-CHARGER

BACKGROUND OF THE INVENTION

This invention relates to a motorcycle with a turbo-charger and more particularly to an improved arrangement locating and driving the turbo-charger within the confines of the motorcycle.

Recently it has been proposed to improve the performance of motorcycles by boosting the pressure of the intake charge through the use of a turbo-charger. Due to the relatively small size and compact nature of a motorcycle, however, it is difficult to locate the turbo-charger and route the exhaust gases to it in such a manner that problems do not develop. For example, it is necessary to deliver the exhaust gases to the turbine stage of the turbo-charger so as to drive the turbo-charger. With multi-cylinder engines this has presented considerable difficulties since it previously has been proposed to bring the individual exhaust pipes of the engine down the side of the engine to drive the turbo-charger. Due to the high heat of the exhaust gases, such an arrangement locates the exhaust pipes in an area where the rider may have to assume an awkward riding position to avoid the heat of the exhaust pipes. In addition, previously proposed arrangements resulted in the location of the exhaust pipes and associated pipes to and from the turbo-charger in such a location as to complicate the maintenance of the other components of the motorcycle.

It is, therefore, a principal object of this invention to provide an improved layout for a turbo-charged motorcycle.

It is another object of this invention to provide a turbo-charger for a motorcycle wherein the exhaust pipes are located remotely from the rider and in a location so that they will not interfere with the normal maintenance of the motorcycle.

In addition to the aforenoted problems in locating the turbo-charger and the pipes leading to and from it, it is also very desirable to position the turbo-charger in such a location that it will be protected from damage and also shielded from the elements. For example, since the turbine stage of the unit is at a very high temperature, it is important to insure that water will not be thrown onto this stage with the motorcycle is being operated in the rain. The sudden cooling that would result by the impingement of water on the turbine could very well cause cracking of the turbine housing.

It is, therefore, a further object of this invention to provide an improved configuration for a turbo-charged motorcycle wherein the turbo-charger is located so as to be protected from damage and from the elements.

SUMMARY OF THE INVENTION

This invention is adapted to be embodied in a motorcycle having a frrame assembly, a pair of wheels suspended from said frame assembly, an internal combustion engine having a plurality of exhaust pipes, and an induction system for the engine including turbo-charger means for delivering a boost to the intake charge. In accordance with the invention, the turbo-charger means is positioned between the engine and the rear wheel. The exhaust pipes merge in a collector section that is positioned beneath the engine and which has a discharge section that extends from the collector section to the turbine stage of the turbo-charger.

Another feature of the invention is adapted to be embodied in a motorcycle having a frame assembly, a pair of wheels suspended from the frame assembly, mud guard carried by the frame in proximity to the rear wheel, an internal combustion engine, and an induction system for the engine including turbo-charger means for delivering boost to the intake charge. In conjunction with this feature of the invention, the turbo-charger is positioned between the engine and the mud guard so as to be protected by the engine and mud guard.

DETAILED DESCRIPTION OF THE PREFERRED EMBODIMENT

Figure 1:
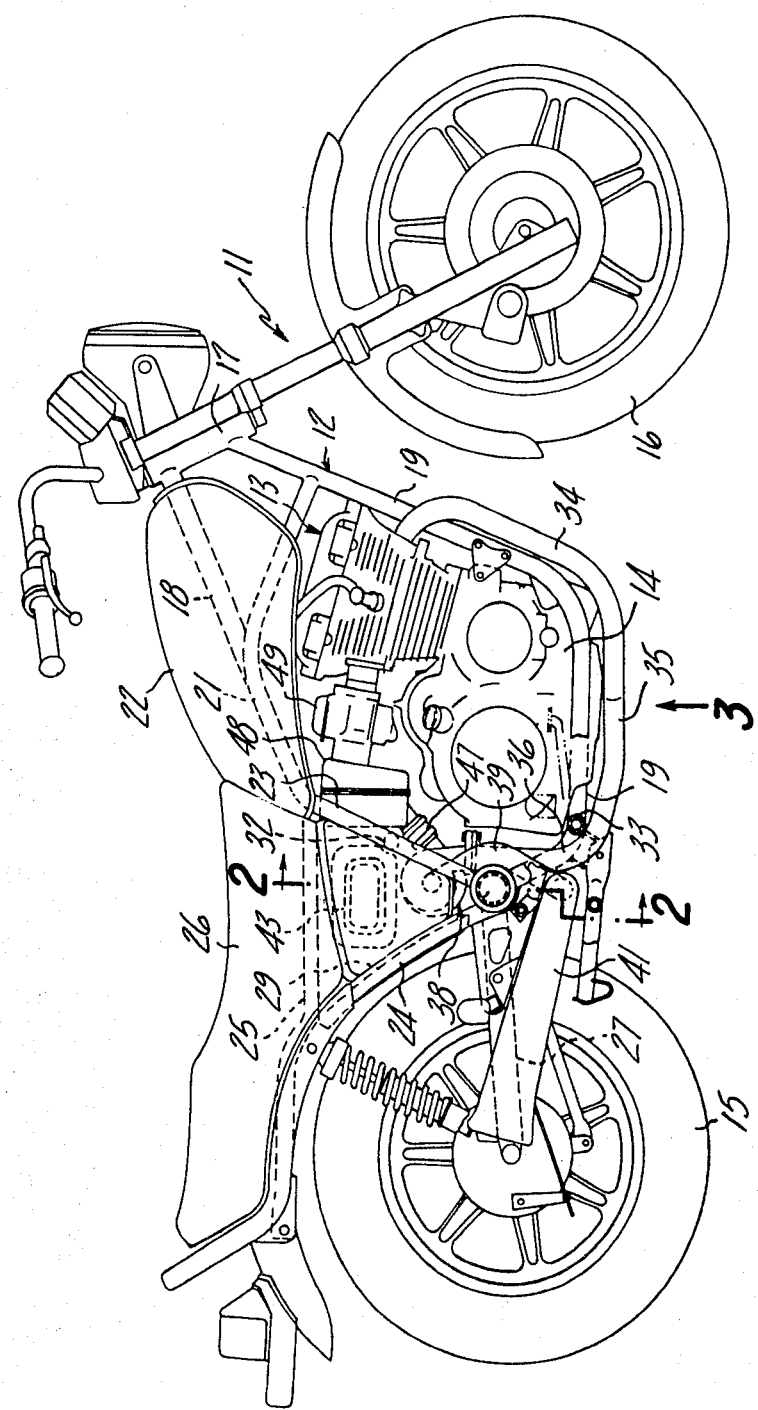
FIG. 1 is a side elevational view of a turbo-charged motorcycle constructed in accordance with an embodiment of the invention.

A motorcycle constructed in accordance with this embodiment is identified generally by the reference numeral 11. The motorcycle 11 includes a frame assembly, indicated generally by the reference numeral 12, which supports an internal combustion engine 13 in a known manner. The engine 13 has a crankcase, clutch and transmission assembly 14, which provides the final drive to a rear wheel 15 of the motorcycle 11 in a manner to be described. The frame 12 also supports a steerable front wheel 16 in a known manner.

The frame 12 is of a tubular construction and includes a head tube 17, a main pipe 18, and a pair of down tubes 19. Tank rails 21 are connected to the down tubes 19 and provide the support for a saddle-shaped fuel tank 22 in a known manner. The tank tubes 21 are integral with seat pillar tubes 23 that extend downwardly. Backstays 24 are connected to the lower ends of the seat pillar tubes 23 and a pair of seat rails 25 that extend rearwardly from the juncture between the tank tubes 21 and the seat pillar tubes 23. The seat rails 25 support a seat 26 in a known manner.

Figure 2:
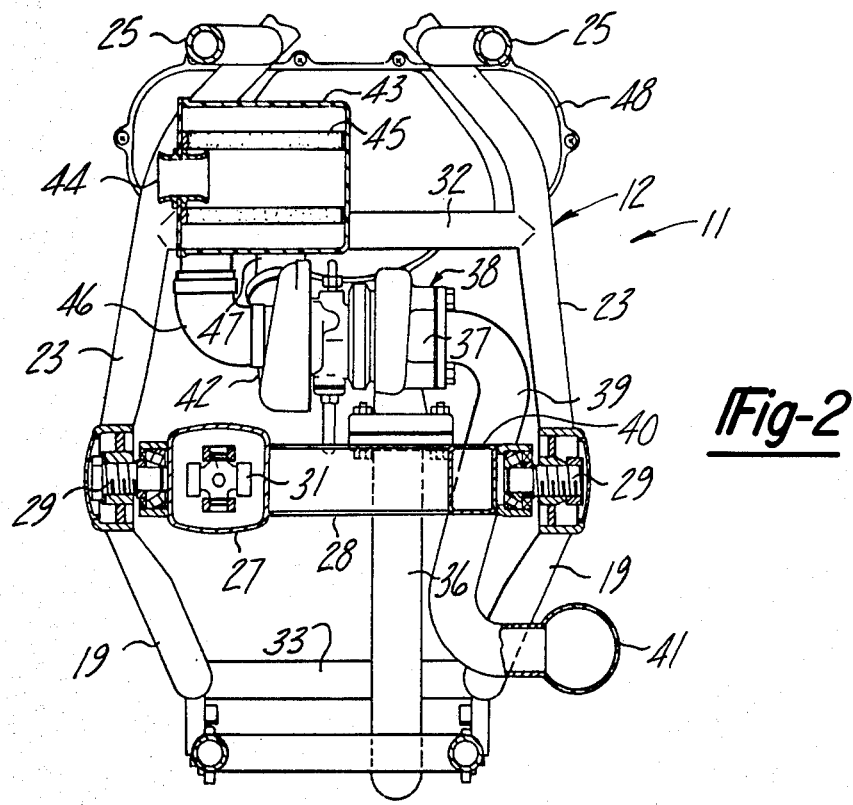
FIG. 2 is a cross-sectional view taken alone the line 2—2 of FIG. 1.
Figure 3:
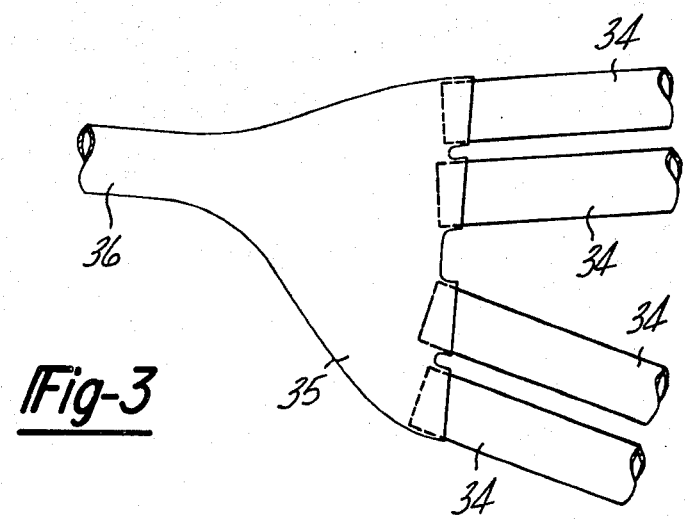
FIG. 3 is a bottom view of a portion of the exhaust system looking generally in the direction of the arrow 3 in FIG. 1.

A pair of trailing arms 27 and 40 support the rear wheel 15 at their rearward ends in a known manner. The arms 27 and 40 are connected together at their forwardmost end by means of a cross tube 28, which is pivotally mounted by a pair of spaced bearings 29 located at the juncture between the down tubes 19 and seat pillar tubes 23. The trailing arm 27 at the left-hand side of the motorcycle 11, as viewed in FIG. 2, encloses the drive shaft (not shown) and universal joints 31 for providing the final drive to the rear wheel 15 in a known manner. A pair of cross reinforcing tubes 32 and 33 extend between and are affixed to the seat pillar tubes 23 and the down tubes 19 respectively in parallel relation to the cross tube 28 so as to provide further reinforcing for the frame 12.

A splash guard 30 extends between the backstays 24 above the cross tube 28. The splash guard 30 is positioned to intercept any mud, water or foreign articles tht might otherwise tend to be thrown forwardly from the rear wheel 15.

The engine 13 is of the four-cylinder type and in the illustrated embodiment is disposed with its multiple cylinders (4 of them) in line and extending transversely to the longitudinal axis of the frame 12. An exhaust pipe 34 extends from each exhaust port of the engine and downwardly therefrom toward the underside of the lowermost portion of the down tubes 19. On the underside of the crankcase transmission assembly 14 the exhaust pipes 34 all merge into a collector section 35. The collector section 35 has an outlet pipe 36 which curves upwardly toward the rear of the transmission crankcase assembly 14 and forwardly of the cross tube 28 of the rear suspension. The collector outlet pipe 36 terminates at an inlet to a turbine stage 37 of a turbo-charger, indicated generally by the reference numeral 38. The turbo-charger 38 is positioned with its rotational axis extending transversely to the frame 12 and paralel to the crankcase of the engine 13. The turbo-charger 38 is positioned between the seat pillar tubes 23 and vertically located between the cross tube 28 and reinforcing frame cross tube 32. The turbo-charger 38 is also located forwardly of the splash guard 30 so as to be protected from water and mud that may be thrown upwardly from the rear wheel 15. The turbo-charger 38 is also position upwardly and rearwardly of the engine crankcase transmission assembly 14. Thus, it should be readily apparent that the turbo-charger 38 is located within the confines of the major components of the motorcycle 11 and, thus, will be protected by these components from damage even if the motorcycle 11 should fall.

An exhaust pipe 39 extends from the outlet stage of the turbine 37 and curves downwardly at a location forward of the rear suspension cross tube 28. Thus, the pipes 36 and 39 are located so that they will not interfere with maintenance and/or removal of the rear suspension of the motorcycle 11. The exhaust pipe 39 terminates at a muffler 41 that silences the exhaust gases and discharges them to the atmosphere.

The turbo-charger 38 has a compression stage 42 which is driven in a known manner by the turbine stage 37. An air cleaner 43 is supported immediately beneath the seat rails 25 and has an inlet opening 44 that extends to one side of the motorcycle 11. The intake air drawn into the inlet opening 44 is filtered by means of a filter element 45 and is delivered to the inlet to the compressor stage 42 by means of a relatively short intake pipe 46.

The intake air compressed by the turbo-charger 38 is discharged through a relatively short discharge pipe 47 which in turn delivers the pressurized air to a plenum chamber 48. The plenum chamber 48 serves one or more carburetors 49 which, in turn, delivers the fuel air charge to the cylinders of the engine 13 in a known manner. The use of the plenum chamber 48 insures that pulsations in the intake strokes of the individual cylinders will be minimized and a more nearly laminer flow is provided to the intakes of the carburetors 49. Like the air cleaner 43, the plenum chamber 48 is protected within the frame, and specifically between the seat pillar tubes 23. Thus, both the air cleaner 43 and the plenum chamber 48 are conveniently located within the frame in an area that might otherwise be vacant. Thus, a compact arrangement results which also insures relatively short intake pipes to be used between the air cleaner 43 and turbo-charger 38 and between the turbo-charger 38 and the plenum chamber 48. Thus, flow restrictions to the intake charge are minimized and power output can be maximized.

It should be readily apparent from the foregoing description that the various induction system components including the turbo-charger 38 are disposed within the confines of the frame and protected by the frame, the engine 13, and the crankcase transmission assembly 14. Also, the exhaust pipe 34 and collector section 35 are positioned so that they will be free of the rider's legs. Also the components are all located so that they will not interfere with normal maintenance of the motorcycle. Although the preferred embodiment of the invention has been disclosed, it is to be understood that various changes and modifications may be made without departing from the spirit and scope of the invention, as defined by the appended claims.

We claim:

1. In a motorcycle having a frame assembly, a a pair of wheels suspended from said frame assembly, the rear wheel being suspended from the frame assembly by a pair of trailing arms interconnected by a cross tube extending transversely across said frame assembly and pivotally supported thereupon, an internal combustion engine having a plurality of exhaust pipes extending in a transverse row from the forwardmost position of said engine, and an induction system for said engine including turbo-charger means for delivering a boost to the intake charge, the improvement comprising said turbo-charger means being positioned between said engine and the rear of said wheels and adjacent to said cross tube, said exhaust pipes extending downwardly and merging in a collector section positioned beneath said engine and a discharge section extending from said collector section to the turbine stage of said turbo-charger.

2. A motorcycle as set forth in claim 1 wherein the discharge section of the collector section extends forwardly of the cross tube and further including exhaust pipe means extending from the discharge end of the turbo-charger turbine section forwardly of said cross tube and terminates at a muffler extending rearwardly of said motorcycle.

3. A motorcycle as set forth in claim 1 further including a shield interposed between the rear wheel and the turbo-charger means for protecting the turbo-charger means from foreign articles thrown by said rear wheel.

* * * * *